June 11, 1957            K. ZINNER            2,795,104
STATIONARY JET ENGINE POWER PLANT WITH PREPOSED TURBINE
Filed Jan. 19, 1951
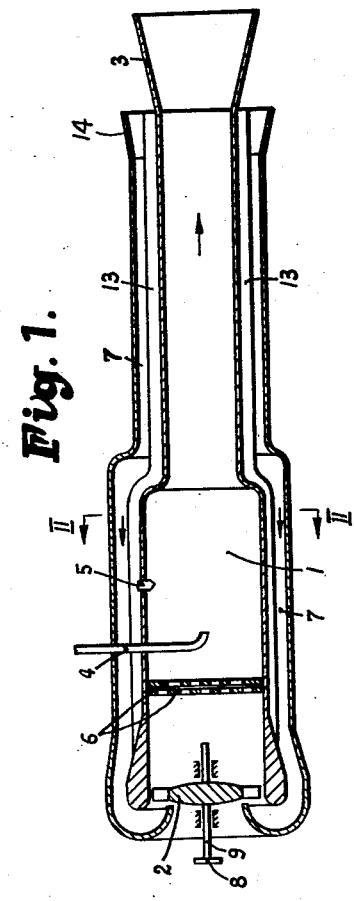
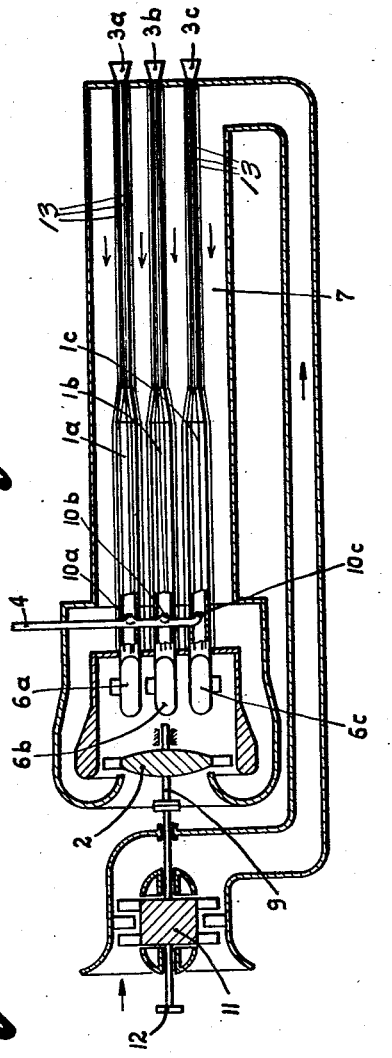
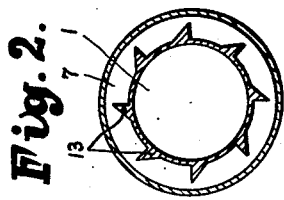
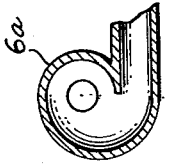
INVENTOR
KARL ZINNER
BY
Marechal & Biebel
ATTORNEYS § 2,795,104
Patented June 11, 1957

2,795,104

STATIONARY JET ENGINE POWER PLANT WITH PREPOSED TURBINE

Karl Zinner, Augsburg, Germany, assignor to Maschinenfabrik Augsburg-Nürnberg A. G., Augsburg, Germany, a corporation of Germany Application January 19, 1951, Serial No. 206,841

Claims priority, application Germany August 23, 1950

5 Claims. (Cl. 60—35.6)

This invention relates to a jet engine plant having a self-sucking and self-igniting pulsating combustion chamber of the type known for example as jet pipe or Schmidt pipe.

This combustion chamber is based on the principle of introducing some fuel into the combustion chamber initially filled with atmospheric air and inflaming the resulting combustible mixture by an auxiliary ignition device. Thus a positive pressure wave advancing towards the open end of the combustion chamber results; flowing of the gases in an opposite direction is prevented by non-return valves at the inlet end of the combustion chamber. At the open end of the tube, advantageously fitted with a diffuser, the advancing positive pressure wave is converted into a retrograding negative pressure wave. This powerful negative pressure wave retrograding in the hot gas causes fresh air to be sucked in for the subsequent combustion and ignition of the fresh mixture. This is because during a longer running period in a tube a negative pressure wave is deformed in such a way that its rear slope, referring to the diagrammatic sine-curve representation of the pressure wave, has an ever increasing gradient and finally passes over into a compression impulse. In the front zone of the compression impulse the temperature is considerably increased. Therefore, if the retrograding negative pressure wave has sucked in a sufficient amount of fresh air and an ignitable mixture is produced therefrom by the feeding of fuel, even a compression impulse of a relatively small pressure rise or shock wave will cause ignition at the transitional zone between the hot waste gas and the cold mixture. This combustion front now passes through the whole rest of the ignitable fresh mixture, causing again a positive pressure wave advancing towards the open end of the tube. Then the cycle of operations will commence again.

In order to take useful energy from stationary combustion engines of this kind, a turbine may be arranged either behind or before the combustion chamber. The last mentioned arrangement offers the advantage that the turbine is passed only by the sucked-in air or by a combustible mixture so that more particularly the material of the blades is not exposed to the high temperatures and, in case of the combustion of powderous solid fuels, to flaky ashes. True, the efficiency of the plant with preposed turbine is lower than that of the plant in which the turbine is located in succession to the combustion chamber, but it can be improved substantially by the provision of a heat exchanger since the drop in temperature owing to the higher initial temperature of the gas becomes correspondingly higher. However, the gas temperature still can be made lower than in a turbine located in succession to the combustion chamber, so that special high temperature materials, more particularly, for the turbine blades, are not required. However, the accommodation of the heat exchanger occupying a very large space causes difficulties in such internal combustion engine plants whose advantage primarily resides in their simple construction.

It is an object of the present invention to provide a design of the heat exchanger by which this great advantage of this type of combustion engine plant, i. e. the simplicity of its construction, is not made illusory by the provision of the heat exchanger.

With this and further objects in view I combine the pulsating combustion chamber and the heat exchanger by leading the sucked-in air or mixture, before entering into the turbine, through a jacket surrounding the combustion chamber.

According to a further feature of the invention the combustion chamber is advantageously subdivided into a number of parallelly connected smaller chambers whereby the transmission of heat owing to the lower wall thickness of the individual chambers and the larger contact surface is substantially improved.

As is well known, the coefficient of heat transmission in a jet pipe owing to the pulsating flow is extremely high. On the outer side of the combustion chamber the transmission of heat is favored by the higher density of the air; moreover, a further improvement in the same sense can be achieved by the provision of ribs at the outer surface of the wall or walls of the combustion chamber. In this manner it is possible to do with a smaller heat transmission surface than in the conventional heat exchangers and to retain the advantage of the simple construction and good utilization of heat, while avoiding a separate heat exchanger which in a conventional jet combustion engine plant is a high additional burden owing to its size, weight, and costs. Simultaneously the hot combustion chamber is very efficiently insulated towards the outside, whereby an insulating cover for the combustion chamber is saved.

A still further improvement as to the transmission of heat can be achieved by arranging before the turbine a compressor driven from the turbine, whereby the velocity of flow of the pre-compressed air in the jacket of the combustion chamber is increased. Moreover, the efficiency of the turbine is augmented by the higher drop in temperature.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a diagrammatic view of a jet engine plant having the invention applied thereto, Fig. 2 is a cross section through the combustion chamber on the line II—II in Fig. 1, Fig. 3 is an axial section of a jet engine plant with a subdivided combustion chamber and a preposed compressor, and Fig. 4 is a section through one of the non-return chokes of Fig. 3.

Similar reference numerals denote similar parts in the different views.

Referring now to the drawing in greater detail, and first to Fig. 1 it will be seen that a turbine 2 is preposed to the pulsating combustion chamber 1, said turbine being passed by the air automatically sucked in by the combustion chamber. A diffuser 3 is arranged at the open end of the combustion chamber 1. The fuel, for instance, in a liquid form, is injected through a pipe 4 and in the starting operation is inflamed by the auxiliary ignition device 5. A non-return device or check valve 6 is interposed between the combustion chamber 1 and the turbine 2. By way of alternative other check valves may be used at this point. The sucked-in air flows through the jacket space 7 surrounding the combustion chamber 1 and is heated up therein by contact with the hot walls of the combustion chamber. The energy is taken off at the flange 8 of the turbine shaft 9. Fig. 2 shows how the ribs 13 are arranged at the walls of the combustion chamber 1.

In the embodiment according to Fig. 3 the combustion chamber is subdivided into a number of small combustion chambers exemplified by three chambers 1a, 1b, 1c all connected in parallel to a common inlet. It will be understood that still further combustion chambers may be arranged, for instance, in front and to the rear of the sectional plane shown in Fig. 3, thus forming a whole nest of combustion chambers, each combustion chamber having a separate injection device 10a, 10b and 10c associated thereto and fed by the fuel pipe 4. It will be understood that it is also possible to provide separate fuel pipes leading to the injection device so that the formation of the mixture and the ignition does not take place in all chambers simultaneously but with a temporal displacement. Thus it is possible to compensate the fluctuations of pressure before the turbine to a certain extent so that the flow of gas to the turbine is more uniform. In order to render it possible to influence the rythm of operation of the combustion chamber 1 or of the combustion chambers 1a, 1b and 1c, it is advantageous to contiol the injection of fuel.

Each chamber has its associated non-return chock 6a, 6b and 6c, one of which is shown in section in Fig. 4, while the turbine 2 is passed by all of the air sucked in by the combustion chambers. Diffusers 3a, 3b and 3c are arranged at the open tail ends of the combustion chambers. The cover or jacket of the nest of combustion chambers is designed in such a way that the air flows not only past the outer walls of the nest but also between the individual combustion chambers, whereby the heat transmitting surface is multipled.

Contrary to the embodiment shown in Fig. 1 in the exemplification of Fig. 3 a compressor 11 is preposed to the turbine 2 and driven thereby. The increase of pressure of the air results in a further improvement of the efficiency of the turbine 2 and the higher velocity of flow produces an improved transmission of heat at the walls of the combustion chambers so that the drop of temperature available for the turbine 2 is also augmented. Again the walls of the combustion chambers may be provided with outer ribs similar to those shown at 13 in Fig. 2. The useful energy of the plant may be taken from the flange 12 of the compressor shaft.

It will be understood that the plant shown in Fig. 1 may also be fitted with a compressor for preliminary compression of the air. Since pulsations of the Schmidt tube are progressing in the heat exchanger no matter whether the same is arranged before or behind the turbine, these pulsations may be utilized for further increasing the drop of pressure in the turbine. Therefore, where the combustion chambers are operating synchronously and in the same phase, the jacket tubes of the heat exchanger surrounding the combustion chamber tubes should be rated in such a way as to their length and cross section that resonance with the pulsations in the combustion chambers is established, i. e., that presure waves of large amplitudes are produced. In this way on the one hand it is achieved that the turbine interposed between the heat exchanger and the combustion chamber is subjected to a high drop of pressure for optimum efficiency, and on the other hand the velocity waves accompanying the pressure waves increase the transmission of heat in the heat exchanger. Thus the transmission of heat is increased on both sides of the heat transmitting surfaces by pressure and velocity waves.

According to a further feature of the invention the inlet channel for feeding fresh air into the heat exchanger may be tapered nozzle-fashion in the main direction of flow, as indicated at 14 in Fig. 1, in order that possible retrograding pressure waves may be reflected with minimum losses.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A jet combustion power plant adapted for stationary operation to convert combustion energy into mechanical energy comprising in combination a self-sucking self-igniting pulsating combustion chamber, an intake pipe at the inlet end of said chamber for introducing combustion gas thereinto, a low temperature gas turbine in said intake pipe preposed to said camber for converting energy produced in said combustion chamber into usable mechanical energy and operable by low temperature gas sucked through said intake pipe into said chamber for subsequent combustion therein, one-way choke means interconnecting said intake pipe and said combustion chamber obstructing passage of gas pressure impulses from said chamber backward toward said turbine, a jacket surrounding said combustion chamber defining exteriorly thereof a heat-exchanging passage, and means interconnecting said jacket with said intake pipe for passing gas through said jacket in heat-exchange contact with said combustion chamber before contacting said turbine.

2. A jet combustion power plant adapted for stationary operation to convert combustion energy into mechanical energy comprising in combination a self-sucking self-igniting pulsating combustion chamber, an intake pipe at the inlet end of said chamber for introducing combustion gas thereinto, a low temperature gas turbine in said intake pipe preposed to said chamber for converting energy produced in said combustion chamber into usable mechanical energy and operable by low temperature gas sucked through said intake pipe into said chamber for subsequent combustion therein, one-way choke means interconnecting said intake pipe and said combustion chamber obstructing passage of gas pressure impulses from said chamber backward toward said turbine, a jacket surrounding said combustion chamber defining exteriorly thereof a heat exchanging passage, the length and correlated cross-sectional area of said jacket and said heat exchange passage effecting resonance of pressure impulses in said passage with pulsations in said combustion chamber, and means interconnecting said jacket with said intake pipe for passing gas through said jacket in heat exchange contact with said combustion chamber before contacting said turbine.

3. A jet combustion power plant adapted for stationary operation to convert combustion energy into mechanical energy comprising in combination a self-sucking self-igniting pulsating combustion chamber, an intake pipe at the inlet end of said chamber for introducing combustion gas thereinto, a low temperature gas turbine in said intake pipe preposed to said chamber for converting energy produced in said chamber into usable mechanical energy and operable by low temperature gas sucked through said intake pipe into said chamber for subsequent combustion therein, one-way choke means inter-connecting said intake pipe and said combustion chamber obstructing passage of gas pressure impulses from said chamber backward toward said turbine, a jacket surrounding said combustion chamber defining exteriorly thereof a heat-exchanging passage, heat-exchange ribs on the outside of said chamber in said passage, and means interconnecting said jacket with said intake pipe for passing gas through said jacket in heat-exchange contact with said combustion chamber and said ribs before contacting said turbine.

4. A jet combustion power plant adapted for stationary operation to convert combustion energy into mechanical energy comprising in combination a self-sucking self-igniting pulsating combustion chamber, an intake pipe at the inlet end of said chamber for introducing combustion gas thereinto, a low temperature gas turbine in said intake pipe preposed to said chamber for converting energy produced in said chamber into usable mechanical energy and operable by low temperature gas sucked through said intake pipe into said chamber for subsequent combustion therein, one-way choke means interconnecting said intake pipe and said combustion chamber obstructing passage of gas pressure impulses from said chamber backward toward said turbine, a jacket surrounding said combustion chamber defining exteriorly thereof a heat-exchanging passage, heat-exchange ribs on the outside of said chamber in said passage, means interconnecting said jacket with said intake pipe for passing gas through said jacket in heat-exchange contact with said combustion chamber and said ribs before contacting said turbine, and a compressor preposed to said jacket and driven by said turbine for compressing intake gas passing through said jacket into said intake pipe.

5. A jet combustion power plant adapted for stationary operation to convert combustion energy into mechanical energy comprising in combination a plurality of self-sucking self-igniting pulsating combustion chambers, means connecting said chambers in parallel for operation as a unit, an intake pipe common to all said chambers at the inlet end thereof for introducing combustion gas thereinto, a low temperature gas turbine in said intake pipe for converting energy produced in said combustion chambers into usable mechanical energy and operable by low temperature gas sucked through said intake pipe into said chambers for subsequent combustion therein, one-way means interconnecting each of said chambers with said intake pipe obstructing passage of gas pressure impulses from said chambers backward towards said turbine, a jacket surrounding all said chambers and defining a heat exchange passage exteriorly of said chambers, and means interconnecting said jacket with said intake pipe for passing gas through said jacket in heat exchange contact with said combustion chambers before contacting said turbine.

References Cited in the file of this patent

UNITED STATES PATENTS

| | | |
|---|---|---|
| 2,414,829 | McCollum | Jan. 28, 1947 |
| 2,454,310 | De Ganahl | Nov. 23, 1948 |
| 2,471,755 | Karrer | May 31, 1949 |
| 2,523,308 | Kemmer | Sept. 26, 1950 |
| 2,525,782 | Dunbar | Oct. 17, 1950 |
| 2,540,594 | Price | Feb. 6, 1951 |
| 2,543,758 | Bodine | Mar. 6, 1951 |
| 2,543,864 | Melenric | Mar. 6, 1951 |
| 2,566,319 | Deacon | Sept. 4, 1951 |

FOREIGN PATENTS

| | | |
|---|---|---|
| 2,209 | Great Britain | Aug. 20, 1908 |
| 603,918 | Great Britain | June 25, 1948 |
| 554,906 | Germany | Nov. 2, 1932 |
| 576,886 | Germany | May 20, 1933 |